US009843989B2

(12) United States Patent
Lin et al.

(10) Patent No.: US 9,843,989 B2
(45) Date of Patent: Dec. 12, 2017

(54) UNIFORM UE INITIALIZATION PROCEDURE FOR BOTH IN-COVERAGE AND OUT-OF-COVERAGE D2D COMMUNICATIONS

(71) Applicant: Nokia Solutions and Networks Oy, Espoo (FI)

(72) Inventors: Xingqin Lin, Austin, TX (US); Rapeepat Ratasuk, Hoffman Estates, IL (US); Amitabha Ghosh, Buffalo Grove, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 161 days.

(21) Appl. No.: 14/176,304

(22) Filed: Feb. 10, 2014

(65) Prior Publication Data

US 2015/0230160 A1    Aug. 13, 2015

(51) Int. Cl.
*H04L 12/26* (2006.01)
*H04W 48/16* (2009.01)
*H04W 76/02* (2009.01)
*H04W 84/18* (2009.01)

(52) U.S. Cl.
CPC ......... *H04W 48/16* (2013.01); *H04W 76/027* (2013.01); *H04W 84/18* (2013.01)

(58) Field of Classification Search
None
See application file for complete search history.

(56) References Cited

U.S. PATENT DOCUMENTS

| 7,120,456 B1 | 10/2006 | Elloit et al. ............ 455/517 |
| 2004/0003111 A1* | 1/2004 | Maeda ............ H04L 45/02 709/237 |

(Continued)

FOREIGN PATENT DOCUMENTS

WO    WO-2005/043830    5/2005

OTHER PUBLICATIONS

Abassi, A., et al.; "A survey on clustering algorithms for wireless sensor netwoks"; Comupter Communications, vol. 30, Issue 14; Oct. 2007; pp. 2826-2841.

(Continued)

*Primary Examiner* — Afshawn Towfighi
(74) *Attorney, Agent, or Firm* — Harrington & Smith (57) ABSTRACT

Methods, apparatuses, and computer program products for providing uniform user equipment initialization procedure for both in-coverage and out-of-coverage device-to device communications are disclosed herein, incorporating a novel tri-timer design: an initial timer, a search timer, and an active timer. In a method a determination is made regarding a user equipment as being a clusterhead candidate which can act as a clusterhead of a cluster. The user equipment searches for a suitable cell or cluster to join. If a suitable cell or a cluster is not found, the user equipment is selected to be a clusterhead which will act as the clusterhead of its own cluster. After selecting the user equipment to be a clusterhead and establishing its cluster, the user equipment transmits a discovery signal which alerting other user equipment to the clusterhead, to which the other user equipment can join. The user equipment as clusterhead then maintains the cluster.

23 Claims, 5 Drawing Sheets (56) References Cited

U.S. PATENT DOCUMENTS

2006/0172756 A1* 8/2006 Sharony ............... H04W 40/02
                                                 455/519
2013/0250771 A1* 9/2013 Yu ...................... H04W 76/023
                                                 370/241

OTHER PUBLICATIONS

Agarwal, R., et al.; "Survey of clustering algorithms for MANET"; International Journal on Computer Science and Engineering, vol. 1, No. 2; 2009; pp. 98-104.
3GPP TSG-RAN WG1 #73, Fukuoka, Japan, May 20-24, 2013, R1-132028, "D2D for LTE Proximity Services: Overview", Ericsson, ST-Ericsson, 6 pgs.
Lin, Xingqin, et al., "An Overview of 3GPP Device-to-Device Proximity Services", IEEE Communications Magazine, Apr. 2014, 9 pgs.
IEEE Std 802.11ac™-2013, IEEE Standard for Information technology—Telecommunications and information exchange between systems, Local and metropolitan area networks—Specific requirements, "Part 11: Wireless LAN Medium Access Control (MAC) and Physical Layer (PHY) Specifications, Amendment 4: Enhancements for Very High Throughput for Operation in Bands below 6 GHz", 425 pgs.

\* cited by examiner

UNIFORM UE INITIALIZATION PROCEDURE FOR BOTH IN-COVERAGE AND OUT-OF-COVERAGE D2D COMMUNICATIONS

TECHNICAL FIELD

This invention relates generally to wireless networks and, more specifically, relates to initializing devices so they can engage in device-to-device communication.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

In a typical mobile communication system, a node or user equipment (UE) is connected to the network via a base station or eNodeB (E-UTRAN), either directly or through a relay station. Communicating device-to-device (D2D) is a subsequent development whereby the devices are typically user equipment. Communicating device-to-device can create an ad hoc network, whereby mobile nodes communicate directly with each other using wireless links.

A device-to-device communication system can be formed without an infrastructure, where such an infrastructure could be stationary and/or mobile. For instance, a device-to-device communication without a stationary base stations or a mobile relay station is possible.

The idea of clustering was introduced to form a more efficient ad hoc wireless network, wherein a group of nodes or UEs forms a specific group or cluster. The one node that coordinates the cluster activities inside the cluster is typically labeled as the clusterhead (CH).

In mobile ad hoc networks, CHs can be responsible for routing. Mobile nodes in a cluster first send their traffic to the CH and then the CH routes the traffic to other CHs until reaching the corresponding destinations.

While clustering has been discussed regarding ad hoc wireless communication networks, it is unclear as to how to implement a uniform UE initialization procedure for both in-coverage and out-of-coverage D2D communications.

SUMMARY

This section contains examples of possible implementations and is not meant to be limiting.

Various aspects of examples of the invention are set out in the claims.

According to a first aspect of the present invention, an exemplary apparatus includes one or more processors and one or more memories including computer program code. The one or more memories and the computer program code are configured, with the one or more processors, to cause the apparatus to perform at least the following: determining a first user equipment to be a clusterhead candidate which can act as a clusterhead of a first cluster; searching by the first user equipment for a suitable cell or cluster to join; in response to finding the suitable cell or cluster to join, determining the first user equipment to be a normal user equipment and to synchronize with the suitable cell or cluster; and in response to not finding the suitable cell or a cluster to join, selecting the first user equipment to be a clusterhead which can act as a clusterhead of a first cluster.

According to a second aspect of the present invention, an exemplary apparatus includes one or more processors and one or more memories including computer program code. The one or more memories and the computer program code are configured, with the one or more processors, to cause the apparatus to perform at least the following: selecting a first user equipment to be a clusterhead; establishing a first cluster by the first user equipment; transmitting by the first user equipment a discovery signal which can alert other user equipment that the first user equipment is a clusterhead; in response to other user equipment responding to the discovery signal, allowing other user equipment to join the first cluster; and maintaining the first cluster.

According to a third aspect of the present invention, a method comprising determining a first user equipment to be a clusterhead candidate which can act as a clusterhead of a first cluster; searching by the first user equipment for a suitable cell or cluster to join; in response to finding the suitable cell or cluster to join, determining the first user equipment to be a normal user equipment and to synchronize with the suitable cell or cluster in response to not finding the suitable cell or a cluster to join, selecting the first user equipment to be a clusterhead which can act as a clusterhead of a first cluster.

According to a fourth aspect of the present invention, a method comprising selecting a first user equipment to be a clusterhead; establishing a first cluster by the first user equipment; transmitting by the first user equipment a discovery signal which can alert other user equipment that the first user equipment is a clusterhead; in response to other user equipment responding to the discovery signal, allowing other user equipment to join the first cluster; and maintaining the first cluster.

According to a fifth aspect of the present invention, an exemplary computer program product includes a non-transitory computer-readable storage medium bearing computer program code embodied therein for use with a computer. The computer program code includes instructions to control or carry out determining a first user equipment to be a clusterhead candidate which can act as a clusterhead of a first cluster searching by the first user equipment for a suitable cell or cluster to join; in response to not finding the suitable cell or a cluster to join, selecting the first user equipment to be a clusterhead which can act as a clusterhead of a first cluster; establishing a first cluster by the first user equipment; transmitting by the first user equipment a discovery signal which can alert other user equipment that the first user equipment is a clusterhead; in response to other user equipment responding to the discovery signal, allowing other user equipment to join the first cluster; and maintaining the first cluster.

BRIEF DESCRIPTION OF THE DRAWINGS

In the attached Drawing Figures:

FIG. 1, including

DETAILED DESCRIPTION OF THE DRAWINGS

The present invention addresses how the CH should be selected and how subsequent clustering should be done by providing a uniform UE initialization procedure for both in-coverage and out-of-coverage D2D communication.

As noted earlier, a device-to-device communication system can be formed without an infrastructure. For instance, a device-to-device communication without base stations is possible. In such a situation, each device or node in the network can also act as a router, forwarding data packets to other nodes, or as a central node to coordinate communication within the network. The design of these types of ad hoc networks can involve the development of dynamic routing or coordinating protocols that can efficiently find routes between two communicating nodes. Such routing or coordinating protocols must be able to keep up with the high degree of node mobility that often changes the network topology.

In a large network, flat routing or coordinating schemes can produce an excessive amount of information that can saturate the network. Moreover, because of the heterogeneity of the various nodes, nodes may have highly variable amount of resources, which can yield a hierarchy in their roles inside the network. For example, nodes with large computational and communication power or powerful batteries may be more suitable for supporting the ad hoc network functions, such as routing, than other nodes.

As noted above, in order to form a more efficient ad hoc wireless network the idea of clustering was developed, whereby a group of nodes or UEs forms a specific group or cluster. The one node in a cluster that coordinates the cluster activities inside the cluster is typically labeled as the clusterhead (CH).

Within the cluster there can be other types of nodes. Typically these other types of nodes can be ordinary nodes and gateway nodes, although there might be other designations possible. Ordinary nodes have direct access only to the clusterhead. Gateways are nodes that can hear two or more clusterheads but are substantially ordinary nodes with additional functions of communication linkage not available or enabled in the ordinary nodes. Reference to UEs that do not behave as clusterheads will be referred to as normal UEs.

The CH can act as a router. When a CH is responsible for routing, mobile nodes in a cluster first send their traffic to the CH and then the CH routes the traffic to other CHs until reaching the corresponding destinations. Clusters can be formed to ensure there exists a route between any two nodes. Cluster-based routing can be a solution that limits the amount of routing information that propagates inside the network, grouping the network nodes into a number of overlapping clusters, and making possible a hierarchical routing in which paths are recorded between clusters instead of between nodes, which can increase a route's lifetime, thus decreasing the amount of routing control overhead.

The CH can act as a central node to coordinate communication among the UEs inside the cluster.

The CH can act as a scheduler of communication between the various UEs within its cluster. When the CH acts as a scheduler, the UEs within its cluster do not transmit at the same time and/or create interference with one another. In such a situation the CH acts like an eNB except that it would not receive any message or packet from the UE, but rather coordinating D2D communication. Thus, if one UE within the cluster wants to communicate with another UE within that same cluster, the first UE would send a request to the UE acting as CH. The UE acting as CH would assign a time and frequency resource (or whatever resources would be used for communication) to that first UE for that first UE to transmit its message or packet to the intended recipient UE.

Additionally, the CH can send out a discovery signal thereby allowing other UEs to know of the existence of the cluster. If another UE would wish to join the cluster, then it could communicate with the CH.

In an exemplary embodiment of the present invention, where the CH does not engage in cluster-based routing, the CH would still act as a coordinator and scheduler, and send out a discovery signal. In essence the CH acts like an eNB except it does not actually receive any packet from the UE, but just coordinates D2D communication.

Described herein are clusters in wireless networks. The invention can be used in any variety of such networks. Specific attention may be drawn to wireless communication as of the date of this invention, which can be conducted under LTE Advanced (LTE-A), a mobile communication standard, formally submitted as a candidate 4G system to ITU-T in late 2009. LTE-A was approved into ITU, International Telecommunications Union, IMT-Advanced, and was finalized by 3GPP in March 2011. It is standardized by the 3rd Generation Partnership Project (3GPP) as a major enhancement of the Long Term Evolution (LTE) standard.

Clustering can utilize a CH for collecting data from other nodes in the cluster, aggregating the data and then sending the data to some base station. If nodes have long life cycle, balancing the burden of acting as CH among various nodes comes into consideration in order to maximize network lifetime.

While the idea of clustering is being developed for ad hoc wireless communication networks and wireless sensor networks, no prior solutions as to how to implement a uniform UE initialization procedure for both in-coverage and out-of-coverage D2D communications has been developed.

The description below of solutions put forward in this invention is provided mainly in terms of out-of-coverage scenarios, where the UE is out of communication range from a base station connected to the network and a subsequently established cluster is also out of range from such a base station. However, the techniques are applicable to any device-to-device communication in a wireless network such as LTE-A or similar protocols in in-coverage, partial-coverage, and out-of-coverage scenarios.

CHs for out-of-coverage D2D communications are responsible for coordinating transmissions in their clusters such as local synchronization and radio resource management.

In out-of-coverage D2D communications, data communications are still carried out directly between two devices instead of routing through the CHs.

Due to distinctive traits of out-of-coverage D2D communications, existing clustering algorithms are not suited for out-of-coverage D2D. For out-of-coverage D2D communications, network assistance from a base station or eNodeB (E-UTRAN) is not possible. Thus, as described above, it is helpful in such a situation to have one UE act as clusterhead (CH) within a group of UEs. The CH can help achieve local synchronization, manage radio resources, etc. As a result, the network topology (at least from the perspective of the control plane) is similar to a base station or eNodeB (E-UTRAN), which allows reusing many existing functionalities of a base station or eNodeB (E-UTRAN) to support out-of-coverage D2D.

However, without some device acting as a base station or eNodeB (E-UTRAN), an LTE system cannot work properly with uncoordinated D2D transmissions.

Figure 1A:
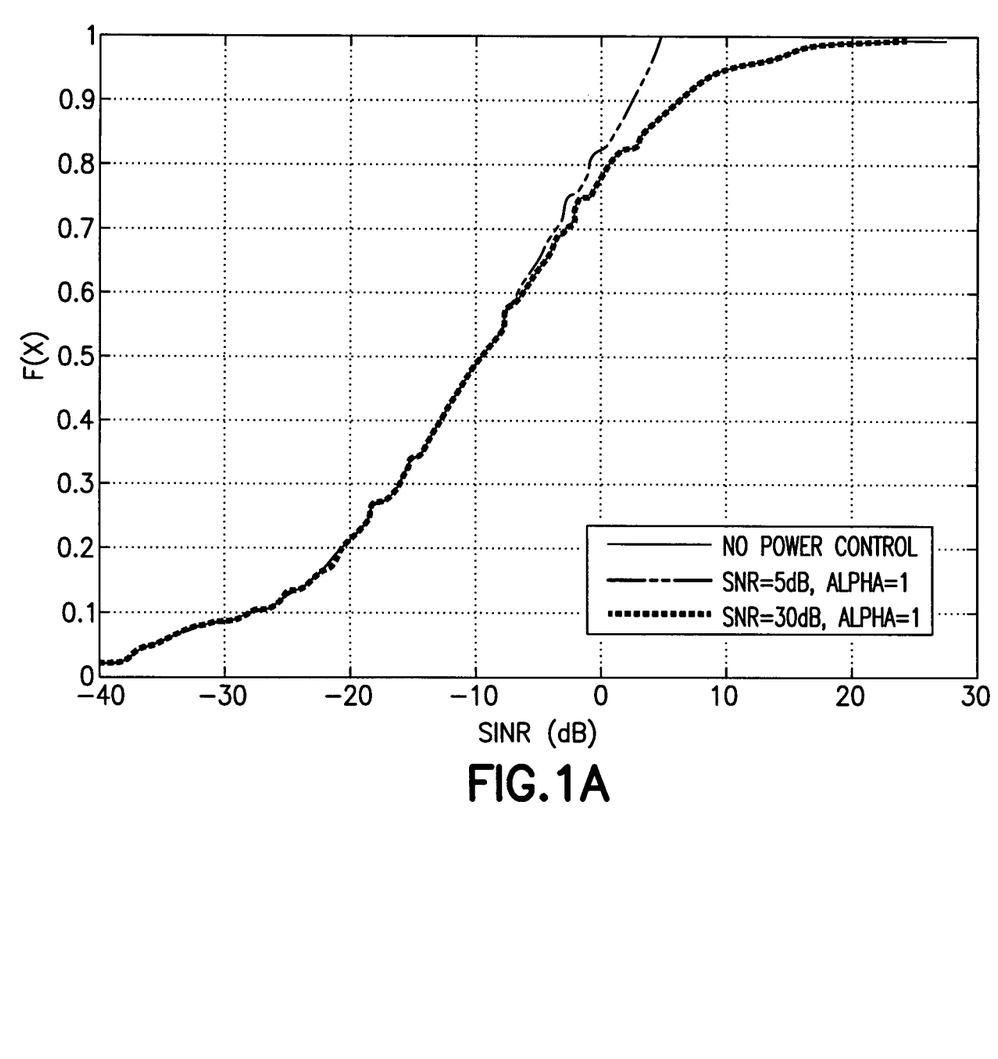
FIG. 1A and FIG. 1B, illustrates graphs representing SINR CDF of D2D links without and with coordination.
Figure 1B:
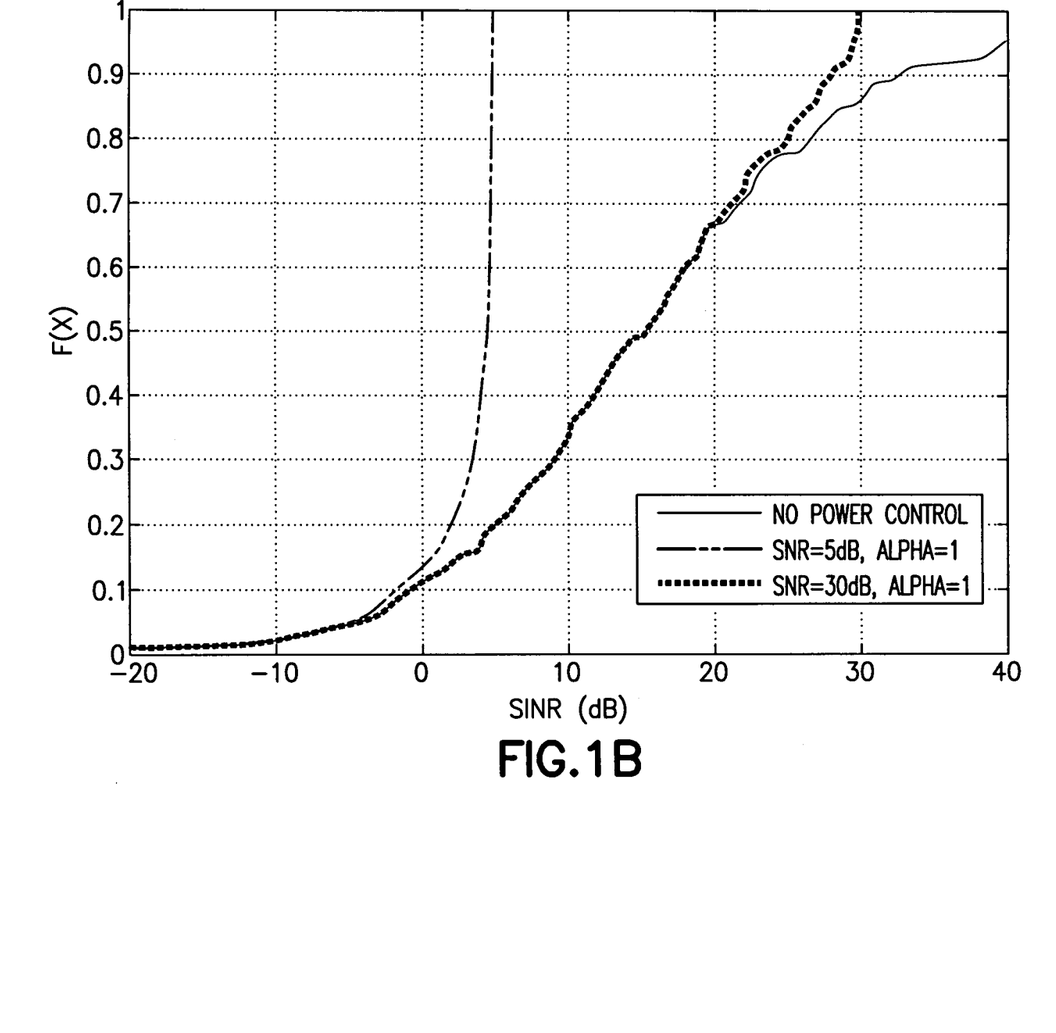

FIG. 1 illustrates two graphs representing SINR CDF of D2D links without and with coordination, FIG. 1A and FIG. 1B, respectively. FIG. 1 considers a 3GPP D2D deployment with ISD=1732 m, D2D range up to 250 m, and 12 transmitting D2D UEs are dropped in each sector. If the 12 transmitting D2D UEs are not coordinated and active simultaneously, the left plot of FIG. 1A shows the resulting undesirable SINR CDF: Only 40% D2D links have greater than −6 dB SINR. In contrast, if the 12 transmitting D2D UEs are coordinated and occupy orthogonal LTE physical RBs, a much better SINR distribution can be obtained, as shown in the plot of FIG. 1B. In this case, 95% D2D links have greater than −6 dB SINR.

The above discussion and the simulation results imply that D2D links have to be coordinated for successful LTE transmission. While in-coverage D2D links may be coordinated by base stations, eNodeBs, or E-UTRANs, such network assistance is not available to out-of-coverage D2D. Thus, other schemes are expected to ensure successful D2D deployment in out-of-coverage scenario.

One possible approach to coordinating D2D links is based on random media access control (MAC) protocol like Carrier Sense Multiple Access (CSMA) used in wireless local area networks (WLAN). However, random access schemes normally involve certain inefficiencies. Although CSMA improves upon well-known random access techniques such as ALOHA, when node density is high CSMA can perform almost as poorly as ALOHA. Moreover, random access schemes do not fit well to existing LTE architecture and thus significant standardization efforts may be required to support out-of-coverage D2D.

Another approach to coordinating out-of-coverage D2D links in 3GPP is to have one UE act as CH within a group of UEs, where the CH can coordinate D2D transmissions in its cluster. Compared to random access, this centralized CH-based scheme is more efficient. More importantly, the network topology is similar to E-UTRAN where eNB serves UEs in its cell. As a result, many existing functionalities of E-UTRAN may be applied (perhaps with some modification) to out-of-coverage D2D. This solution would save significant standardization effort in 3GPP.

Figure 2:
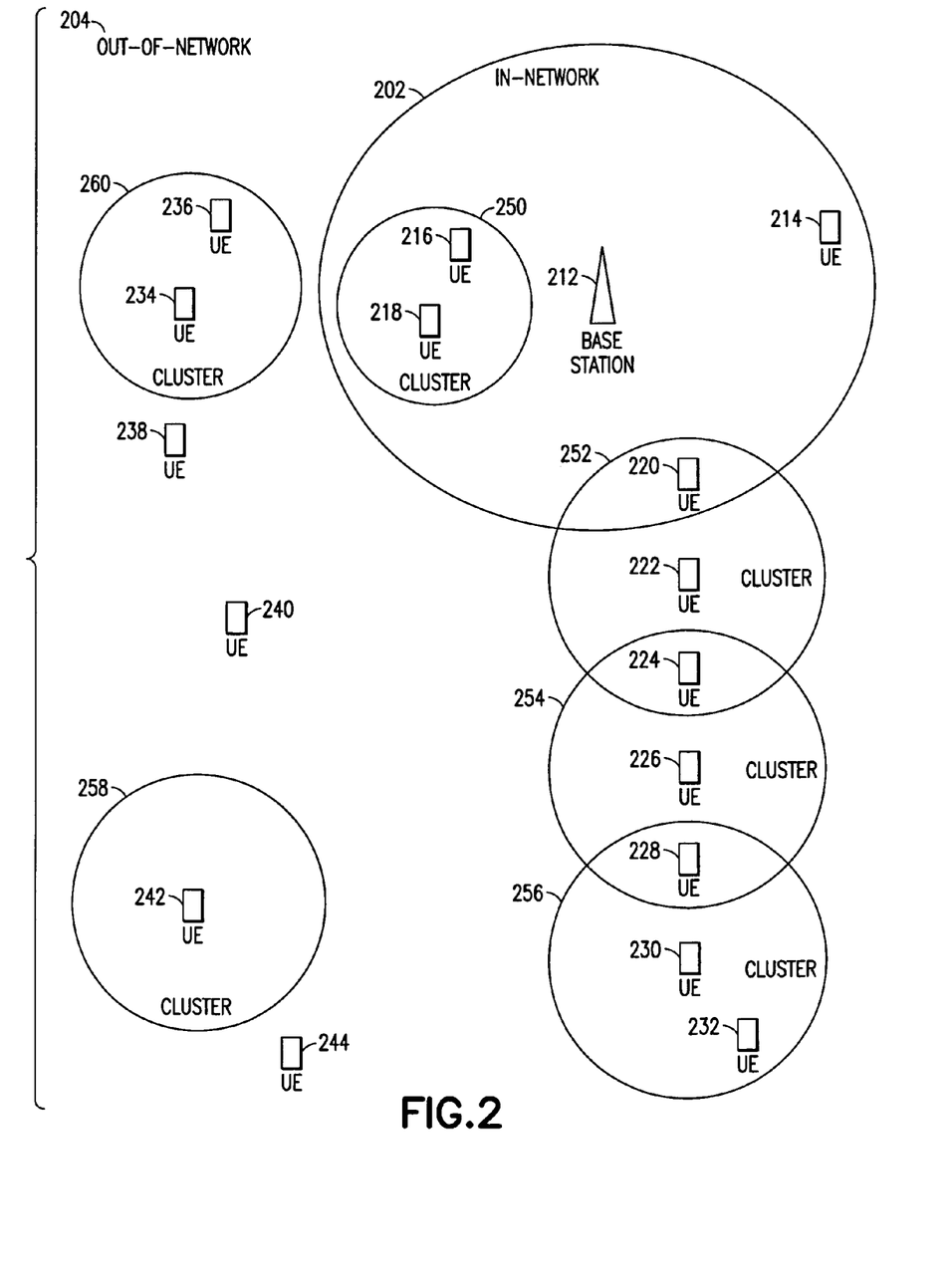
FIG. 2 illustrates various UEs in and out of clusters preforming various functions with respect to clustering.

FIG. 2 depicts various UEs and other devices; where some UEs are in-network and others out of network; where some UEs are in clusters and some are not; and where some UEs are clusterheads, some are normal UEs, and others are gateways. A detailed description of the figure is given below followed by its application to the present subject matter.

The first distinction in FIG. 2 are the areas of network coverage represented by enclosing circle 202 and the areas out-of network coverage 204, which is everything outside of the coverage circle 202. The differentiating feature, for the sake of simplicity is the presence of base station 212 which serves as the connection to the network. Base station 212 could be any element (U-TRAN) that so connects to the network such as an eNodeB or even a relay station. Thus, it is not necessary that the exemplary use of a base station 212 could not be replaced with another element that would give similar functionality, namely, a connection to the network. Typically such a device would be stationary, but there is no need to be so restrictive.

Within the in-network area 202, there are numerous devices, denoted again for simplicity as user equipment, UE. These devices could be mobile telephones, laptops, tablets, or some other similarly useful devices that exists in a mobile wireless network. At the snap-shot of moment of time represented in the illustration, since as a mobile network, membership in the area will most likely vary over time, within the in-network area 202, UEs 214, 216, 218, 220 reside.

Outside the in-network area 202, are those UEs that at that same moment in time are in the out-of-network area 204. These UEs, like the ones within the in-network area 202, are 222, 224, 226, 228, 230, 232, 234, 236, 238, 240, 242, and 244.

Before discussing the various UEs and their positions and functionalities relating to the subject matter herein, there are circles illustrated in FIG. 2 which also represent various spatial areas. These areas are various clusters, clusters 250, 252, 254, 256, 258, and 260, the characteristics of all of which will be discussed in more detail below.

Cluster 250 resides totally within the in-network area 202. Cluster 252 resides partly within the in-network area 202 and in the out-of-network area 204. In contrast, cluster 254, cluster 256, cluster 258, and cluster 260 all reside in the out-of-network area 204.

Now for an elaboration of the various UEs. UE 214 is not within any cluster but still is connected to the network via base station 212 and is thus within the in-network area 202. UEs 216, 218, and 220 are also in communication with base station 212 and as such also within the in-network area 202 even though each of them is also within a cluster. UEs 216 and 218 are in cluster 250, while UE 220 is within cluster 252.

Of the UEs within the in-network area 202, as described earlier in this discloser, these UEs will vary in their function in regards to their clusters or lack thereof. UE 214 would be considered a normal UE as it is not associated with any cluster. UE 218 is designated in the illustration as an example of a clusterhead forming a cluster within an in-network area. Within a cluster within an in-network area there would also exist normal UEs, as described earlier herein, such as UE 216. UE 220 which is in communication with a relay or base station 212 links those UEs within cluster 252 to the network. As such, UE 220 would be considered a gateway.

Turning now to the other clusters represented in FIG. 2, cluster 252 has clusterhead 222 organizing the UE within its spatial realm. Thus, UEs (not shown) in cluster 252 that wish to communicate with the network can do so by communicating with clusterhead UE 222 which in turn transmits and receives signals from the network via gateway UE 220.

Cluster 254 is completely out-of network. Therefore, the only way it can communicate with the network is by having the UEs within it communicate with its clusterhead UE 226, which in turn communicates with gateway UE 224. Gateway UE 224 is within both clusters 252 and 254 and thus can facilitate this gateway linkage.

Please note that in all these instances described in FIG. 2, the communication through the CH could just as well be and more like is with the CH serving as coordinator rather than router such that normal UEs would do the communicating directly and the CH would schedule, etc., such communication as described earlier herein.

As with cluster 254, cluster 256 is also completely out-of-network. Like cluster 254 using UE 226 as clusterhead and UE 224 as gateway in order for normal UEs within cluster 254 to communicate with the network, cluster 256 allows normal UEs such as UE 232 to communicate with the network though clusterhead 230 and gateway UE 228 to cluster 254 clusterhead 226 to gateway UE 224 to clusterhead UE 222 to gateway UE 220 to relay or base station 212 and then off to the network.

Depicted also in FIG. 2 are UEs that are completely in the out-of-network zone 204 and not able by linking clusters to communicate back to the network, namely, UEs 234, 236, 238, 240, 242, and 244.

Designated as the clusterhead for this discussion, UE 234 could have a range that allows it to create a cluster that encompasses normal UE 236 but not normal UE 238.

UE 242 could be a clusterhead or a clusterhead designate but as can be seen from the diagram it will not be able to form a cluster if it cannot find other UE within its proposed cluster zone. If the only UE nearby is lonely UE 244 and it is outside of that zone, then cluster 258 will never form.

Standing alone is UE 240, which is not in communication with any other device. It may be designated a clusterhead-candidate and even establish a cluster but with no other UEs to communicate with, it may or will eventually go to sleep depending on the circumstances.

With the selection of a CH, its subsequent clustering should be done by providing a uniform UE initialization procedure for both in-coverage and out-of-coverage D2D communication.

This invention enables a uniform UE initialization solution for both in-coverage and out-of-coverage D2D communications.

The UE initialization procedure disclosed herein incorporates a novel tri-timer design, utilizing three different timing durations, into the existing standardized UE initialization procedure. There is an initial timer, a search timer, and an active timer, each of which is discussed below.

For CH-based out-of-coverage D2D communication, network operation is divided into two phases: CH selection phase and steady state phase.

In the CH selection phase, certain UEs are selected as CHs based on pre-defined criteria. Once that selection is done and a cluster is formed with CH, then a steady-state phase is created.

In the steady state phase, other UEs can then join the cluster of the new CH according to a method such as the existing Cell Search and Selection in LTE. Thereafter, with the coordination of the CH, UEs can perform D2D discovery and communication in the steady state phase.

From a UE's perspective, it has to perform cluster head selection (CHS) when it first appears outside the coverage of eNBs. However, coverage areas of CHs are limited. Thus, the new out-of-coverage UE may have to search for the CHs for quite a long time and in the worst case it may not find a CH at all.

From the network's perspective, due to UE mobility, the network topology changes over time. Correspondingly, CHs should not be fixed but be adaptive, and thus switch between CH selection phase and steady state phase if necessary. We term this cluster head reselection (CHR).

This disclosure proposes a uniform UE initialization procedure for both in-coverage and out-of-coverage D2D communication. For concreteness, this disclosure describes the procedure from the perspective of a newly powered-on UE while keeping in mind that the same procedure can directly be applied when the UE moves out of network coverage or the coverage of eNBs.

The method begins with the UE setting an initial timer for an initial time duration and starting its initial cell/cluster search. For this example, let us examine UEs 222, 226, 230, 234, 240, and 242.

If no cell/cluster is found, then the UE determines whether it should act as a CH. Such CH-candidate determination, determining whether the UE can act as a CH, can be done in alternate ways as described in more detail below in addressing the method flow-chart.

A CH-candidate determination for a UE would comprise at least one of the following: service type; power status; request from network; previous D2D communication; UE class; UE capability; inter-RAT communication; preconfiguration by the network; manual selection; or criteria inherent in the first UE or external to the first UE.

If the UE is not determined to act as a CH, then the UE would behave as a normal UE and follows existing LTE UE procedure. Note again that a normal UE as described earlier could be an ordinary, gateway, or some other designated type of UE but not a CH or acting as a CH. In FIG. 2, UE 236 would be an example of a UE that is not determined to act as a CH for whatever reason would be appropriate.

Otherwise, the UE would proceed to set a new time duration for a search time or set a search timer. UEs 234, 240, and 242 could be examples of UEs entering a search time or starting a search timer.

A UE would start the cell/cluster search timer. Setting the length of the search time or duration of the search timer can be done in alternate ways as described in more detail below in addressing the method flow-chart. The search time duration comprises either a fixed duration, a variable duration, or both. A fixed duration may correspond to cell/cluster search and acquisition time. A variable duration may correspond to the time being set to a variable duration longer than the cell/cluster search and acquisition time.

Search timer duration could be determined by at least one of the following: a characteristic of the first UE, such as class, capability, deployment, service type or other distinguishing category; provided by the network; negotiated with or provided by other UEs using non-LTE radio access technology; manual selection; a signal external to the UE being received by the UE, or a fixed or variable duration criteria inherent in the first UE or external to the first UE.

Search timer duration could be determined by some useable form of ID associated with the first UE.

The UE would have a designated duration of time to conduct a search for any cell and/or cluster. If any cell or cluster is found, then the UE would act as a normal in-coverage and/or out-of-coverage D2D UE. UEs 216, 232, and 236 could be examples of such a UE.

If no cell/cluster is found, the UE first checks if the search timer expires. If the search time duration has not expired, the UE would continue searching for cell/cluster.

When the search time duration expires without the UE finding a cell or cluster, the UE selects itself as a CH and subsequently acts as a CH as described earlier herein. For example, the UE acting as CH may broadcast beacon to assume its CH role and/or broadcast a synchronization signal. UEs 234 and 242 could be examples of such a UE.

Upon assuming the role of CH, the UE enters an active time duration by setting a timer to determine how long it will continue to act as a CH. Setting the length of the active time or duration of the active timer can be done in alternate ways as described in more detail below in addressing the method flow-chart.

The active timer duration could be determined by at least one of the following: service type, power status, request from network, previous D2D communication, previous network communication, preconfigured by the network, manual selection, or criteria inherent in the first UE or external to the first UE.

During this active time, other UEs seek to join the newly formed cluster either on their own or in response to a signal from the UE acting as CH.

If the active time duration expires without any connection from another UE, the UE acting as CH would go to sleep for a period of time, the duration of which could be measured by a sleep timer for a sleep time duration. Setting the length of the sleep time or duration of the sleep timer can be done in alternate ways as described in more detail below in addressing the method flow-chart. After the sleep time duration expires, the UE can repeat the process again from some earlier point.

As can be seen from FIG. 2, if UE 240 did a search, it would find nothing in range. UE 242 even in its active duration would find nothing in range. UE 234 would find UE 236 and perhaps other UEs (not shown) thus establishing a cluster, namely, cluster 260.

When the active time duration expires, if the UE had established itself as CH and connected to one or more other UEs, then instead of going the sleep, the UE would reset the search time and resume the process from that point. Thus, while UE 242 would go to sleep, UE 234 would not and would reset to searching. Alternatively, when the active timer ends, the UE may reset to any point before such that it could restart the initial timer, the search timer, or active timer or it could go to sleep for the duration of a sleep timer and wake-up to restart at any of the earlier points, resetting any of the timers.

Referring to FIG. 2, UE 234 could be an example of an out-of-coverage UE that does not initially find a cluster so it assumes the role of clusterhead candidate and then as an active clusterhead finding UE 236 to join its cluster. As all these UE could be in motion, eventually UE 238 might enter cluster 260, which had been established by UE 234 as CH. At some point the active time duration for UE 234 would expire. If some other UE, say UE 238, has indicia that would favor it rather than UE 234 as CH, then cluster 260 might not form but rather some cluster around UE 238.

Figure 3:
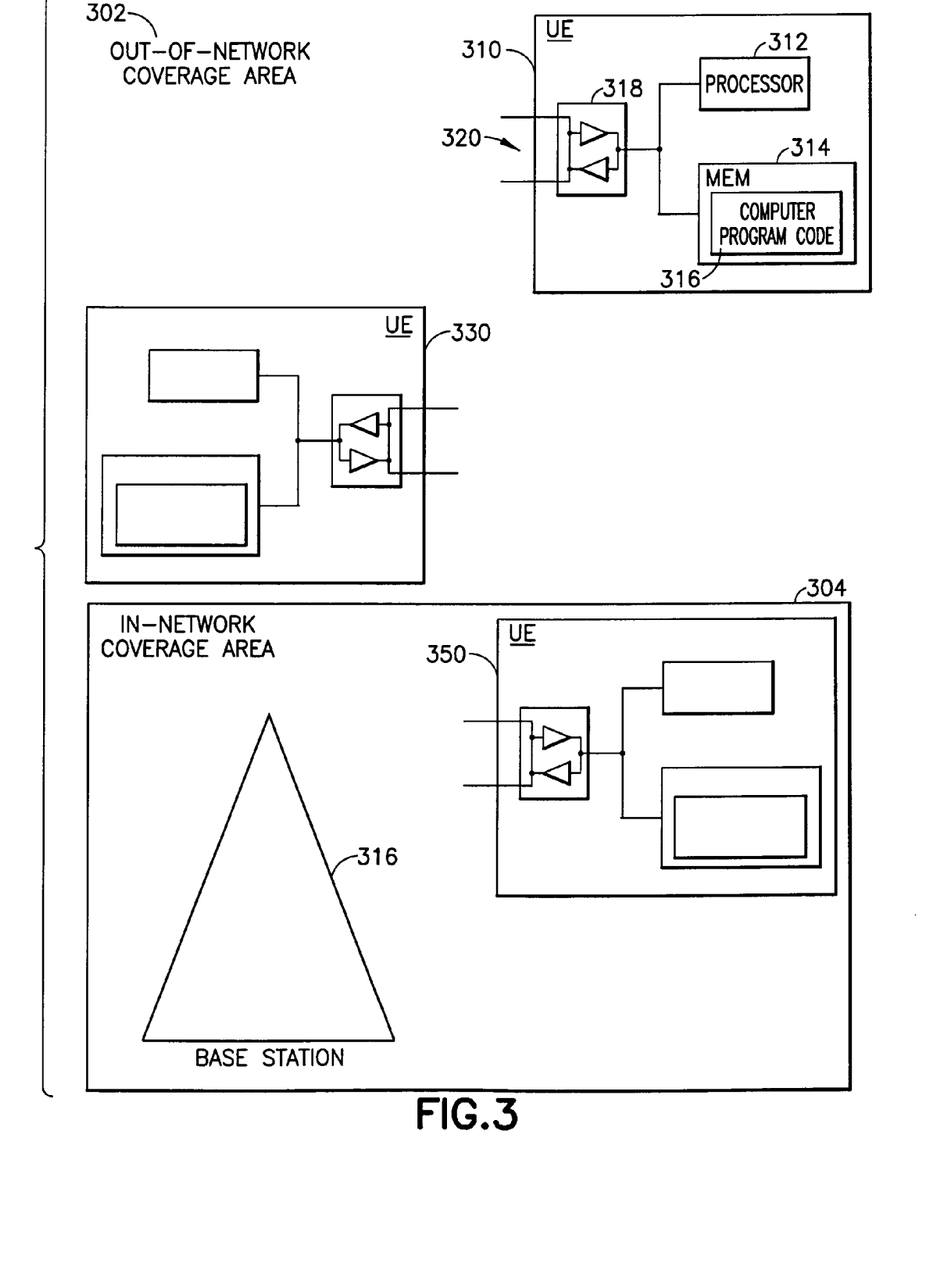
FIG. 3 is a block diagram illustrating possible internal implementations of certain parts of the UEs shown in FIG. 2.

Before proceeding with additional description of problems and solutions herein to those problems, reference is made to FIG. 3, which shows a block diagram of an exemplary system in which the exemplary embodiments may be practiced. FIG. 3 is a block diagram is shown illustrating possible internal implementations of certain parts of the system shown in FIG. 2. In FIG. 3, there are UEs 310, 330, and 350. UE 350 is in an in-network coverage area 304 because it is in communication with base station 316 which anchors any UE within its transmission range into the network. UEs 310 and 330 are in the out-of-network 302 because neither is in communication with the base station 316. The internal configurations of the UEs is substantially the same in the respect that each has processor, represented in UE 310 by processor 312. Processor 312 is in communication via link 316 with at least one non-transitory memory 314, wherein computer program code 316 is stored. The other UEs have similar configurations. UE 310 can communicate with other devices via receiver and transmitter unit 318 connected to antennas 320.

The computer readable memories 314 may be of any type suitable to the local technical environment and may be implemented using any suitable data storage technology, such as semiconductor based memory devices, flash memory, magnetic memory devices and systems, optical memory devices and systems, fixed memory and removable memory. The processors 312 may be of any type suitable to the local technical environment, and may include one or more of general purpose computers, special purpose computers, general or special purpose integrated circuits, microprocessors, digital signal processors (DSPs) and processors based on a multi-core processor architecture, as non-limiting examples.

In FIG. 3, a UE 310 is in not wireless communication with a network, where the zone allowing network communication area is shown as the shaded in-network coverage area 304 and connecting by base station 316. The unshaded area 302 is the out-of network coverage zone.

The user equipment 310 includes one or more processors 312, one or more memories 314, and one or more transceivers 318 interconnected through one or more buses 316. The one or more transceivers 318 are connected to one or more antennas 320. The one or more memories 314 include computer program code 316. The one or more memories 314 and the computer program code 316 are configured to, with the one or more processors 312, cause the user equipment 310 to perform one or more of the operations as described herein. The UE 310 communicates with another UE 330 via link 322.

The internal workings eNB base station 316 are not shown but include one or more processors, one or more memories, one or more network interfaces (N/W I/F(s)), and one or more transceivers interconnected through one or more buses. The one or more transceivers are connected to one or more antennas. The one or more memories include computer program code. The one or more memories and the computer program code are configured to, with the one or more processors, cause the eNB to perform one or more of the operations as described herein. The one or more network interfaces communicate over a network such. Two or more eNBs communicate using, e.g., network. The network may be wired or wireless or both and may implement, e.g., an X2 interface.

The wireless network may include a network control element (NCE) that may include MME/SGW functionality, and which provides connectivity with a further network, such as a telephone network and/or a data communications network (e.g., the Internet).

The UE 330 has a internal configuration similar to that described for UE 310. Likewise, UE 350 also has a internal configuration similar to that described for UE 310. As UE 330 is outside the shaded area, UE 330 is outside of network coverage. If UE 330 has a link (similar to link 322 but not shown) to a UE such as UE 350, to a base station such as base station 316, or some other node such as a relay (not shown), then UE 330 could serve as a gateway. Otherwise, if no such link exists, then UE 330 would be an ordinary UE unless it is designated as a CH. In either case, UE 330 would be a normal UE, a CH, or a CH candidate. For purposes of discussion, UE 310 could be thought of as the CH or CH-candidate and UE 310 as a normal UE that joins a cluster formed by UE 310.

The base station 316 would typically be an eNB coupled via a network to the NCE. The network may be implemented as, e.g., an Si interface. The NCE includes one or more processors, one or more memories, and one or more network interfaces (NAV I/F(s)), interconnected through one or more buses. The one or more memories include computer program code. The one or more memories and the computer program code are configured to, with the one or more processors, cause the NCE to perform one or more operations.

The computer readable memories 314 and in the other devices (not shown) may be of any type suitable to the local technical environment and may be implemented using any suitable data storage technology, such as semiconductor based memory devices, flash memory, magnetic memory devices and systems, optical memory devices and systems, fixed memory and removable memory. The processors 312 and in the other devices (not shown) may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 310 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

An exemplary embodiment of the invention consists of an apparatus which includes one or more processors and one or more memories including computer program code. The one or more memories and the computer program code are configured, with the one or more processors, to cause the apparatus to perform at least the following: determining a first user equipment to be a clusterhead candidate which can act as a clusterhead of a first cluster; searching by the first user equipment for a suitable cell or cluster to join; in response to finding the suitable cell or cluster to join, determining the first user equipment to be a normal user equipment and to synchronize with the suitable cell or cluster; and in response to not finding the suitable cell or a cluster to join, selecting the first user equipment to be a clusterhead which can act as a clusterhead of a first cluster.

In another exemplary embodiment of such an apparatus, determining a first user equipment to be a clusterhead candidate comprises at least one of the following: service type; power status; request from network; previous D2D communication; UE class; UE capability; inter-RAT communication; preconfiguration by the network; manual selection; or criteria inherent in the first UE or external to the first UE.

In another exemplary embodiment of such an apparatus, the searching is performed for a search timer duration.

In another exemplary embodiment of such an apparatus, the search duration is determined by at least one of the following: a characteristic of the first UE, such as class, capability, deployment, service type or other distinguishing category; provided by the network; negotiated with or provided by other UEs using non-LTE radio access technology; manual selection; a signal external to the UE being received by the UE, or a fixed or variable duration criteria inherent in the first UE or external to the first UE.

In another exemplary embodiment of such an apparatus, the search timer duration is determined by some useable form of ID associated with the first UE.

In another exemplary embodiment of such an apparatus, prior to determining the first user equipment to be the clusterhead candidate, the at least one memory and the computer code are further configured, with the at least one processor, to cause the apparatus to at least perform the searching by the first UE for at least a cell or a cluster within an initial timer duration.

Another exemplary embodiment of the invention consists of an apparatus which includes one or more processors and one or more memories including computer program code. The one or more memories and the computer program code are configured, with the one or more processors, to cause the apparatus to perform at least the following: selecting a first user equipment to be a clusterhead; establishing a first cluster by the first user equipment; transmitting by the first user equipment a discovery signal which can alert other user equipment that the first user equipment is a clusterhead; in response to other user equipment responding to the discovery signal, allowing other user equipment to join the first cluster; and maintaining the first cluster.

In another exemplary embodiment of such an apparatus, establishing a first cluster comprises the clusterhead scheduling transmissions by other user equipment which have joined the first cluster to at least not transmit at the same time, create interference with one another, or both.

In another exemplary embodiment of such an apparatus, maintaining the first cluster and transmitting the discovery signal are performed for an active timer duration.

In another exemplary embodiment of such an apparatus, the active timer duration is determined by at least one of the following: service type, power status, request from network, previous D2D communication, previous network communication, preconfigured by the network, manual selection, or criteria inherent in the first UE or external to the first UE.

Figure 4:
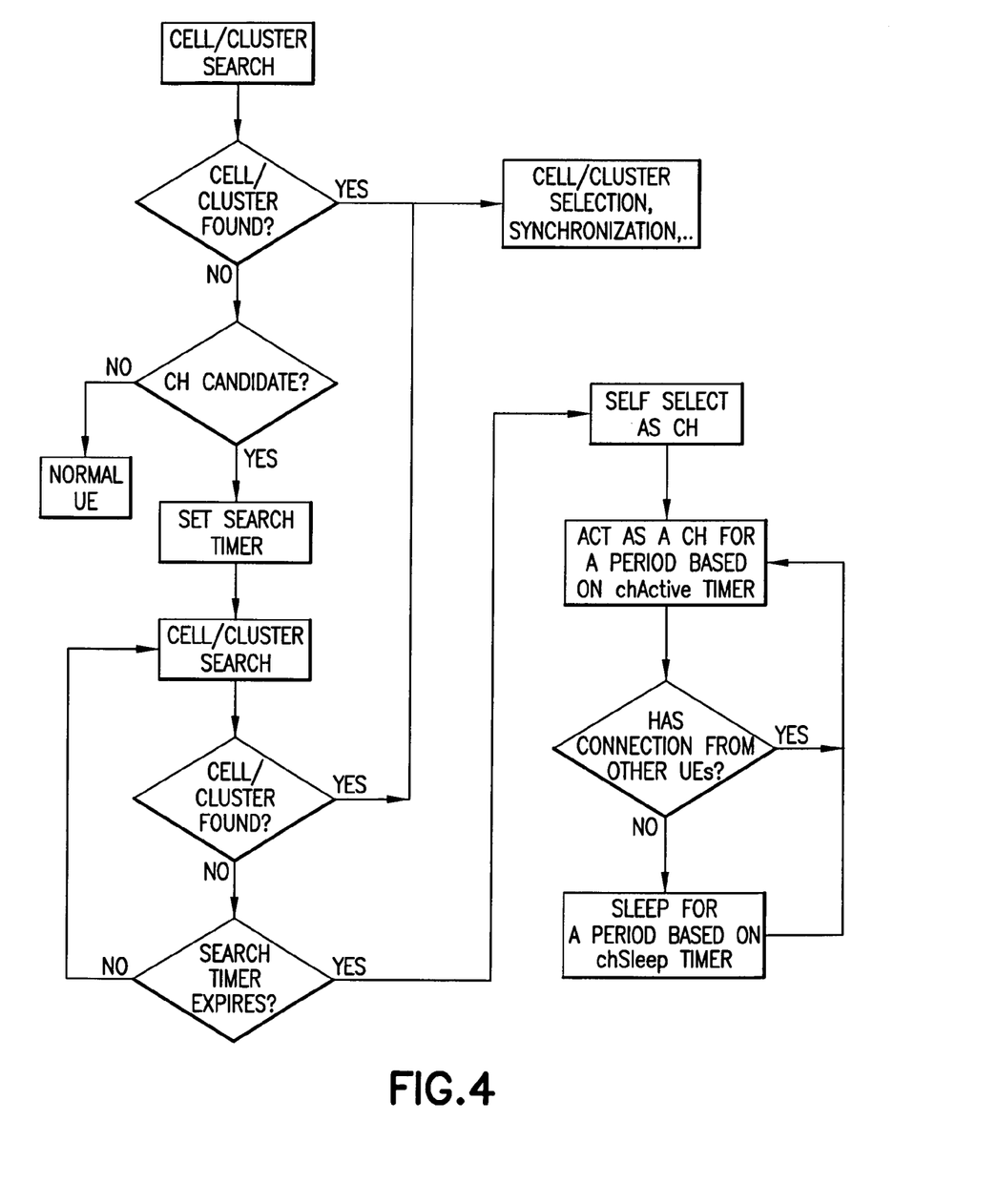
FIG. 4 is a block diagram of an exemplary logic flow diagram performed by a UE in an out-of-network situation, and that illustrates the operation of an exemplary method, a result of execution of computer program instructions embodied on a computer readable memory, and/or functions performed by logic implemented in hardware, in accordance with exemplary embodiments herein.

In another exemplary embodiment of such an apparatus, upon expiration of the active time duration, the first user equipment shall reset the active timer duration, go to sleep, or set another timer duration. FIG. 4 is a block diagram of an exemplary logic flow diagram performed by a UE in out-of-coverage area.

FIG. 4 illustrates the operation of an exemplary method, a result of execution of computer program instructions embodied on a computer readable memory, and/or functions performed by logic implemented in hardware, in accordance with exemplary embodiments herein. The blocks in FIG. 4 may also be considered to be interconnected means for performing the functions in the blocks. The blocks in FIG. 4 are assumed to be performed by the processors 312 under control (at least in part) by memories 314.

The method begins with the UE setting an initial time duration or rather setting an initial timer with an initial time duration and starting its initial cell/cluster search. In block 402, the UE performs the operation of the initial cell/cluster search.

Block 404 is the result of the initial search where a determination is made whether or not the UE has found another cell or cluster or the UE has not found another cell or cluster. For all purposes in this disclosure, anytime the UE is searching for a cell or cluster, if the UE found a cell or cluster but it is not a suitable cell or cluster then the UE would proceed as if it has not found another cell or cluster.

If within the initial time duration a cell or cluster is found, the UE will synchronize with the established cell or cluster using normal procedures represented by block 406.

If within the initial time duration no cell or cluster is found, the UE will decide (or have the decision made for it)

whether or not it should assert itself as a CH-candidate, that decision point represented by block 408.

In block 408, it will be determined whether or not the UE can be a CH-candidate, meaning that the UE meets a certain criterion or certain criteria that would allow it to act as a CH. Some criteria to be used in determining whether the UE should act as a CH may include service type (e.g. public safety or emergency transmission), power status (e.g. battery level), request from network, previous D2D communication, UE class or capability (e.g. aggregator node for MTC), inter-RAT communication, preconfigured by the network, or manual selection, or some other criteria that would prove useful or desirable to designate the UE as a CH-candidate. Such other criteria could be set inside the UE or by some external signal.

If the UE does not meet that criterion or criteria, then the UE would not be able to function as a CH. Block 410 is an example of negative determination to become a CH-candidate, such that the UE will behave as a normal UE.

If the UE can meet a criterion or criteria and become a CH, then in block 412, the UE performs the operation of setting a duration for a search or a search timer.

The search time duration or search timer comprises either a fixed duration, a variable duration, or both. A fixed duration may correspond to cell/cluster search and acquisition time. A variable duration may correspond to the time being set to a variable duration longer than the cell/cluster search and acquisition time. Setting the duration of this time can be done in a number of different ways.

One way to set the duration of the search time is by having a fixed duration used by all the UEs. This duration can be standardized and pre-configured in all UEs. Several duration lengths may be defined based on UE class or capability.

Another way to set the duration of the search timer is by standardizing a possible time range. The ID of a UE could be used to set the search timer duration. For example, each UE could set its own time duration by hashing its ID to one value in the standardized time range (where a hash function is any algorithm that maps data of a variable length to data of a fixed length). Note that although a Radio Network Temporary Identifier (RNTI) (set by the E-UTRAN) would not be available to out-of-coverage UE, other existing UE IDs such as International Mobile Subscriber Identity (IMSI) may be used. Also, some other identifier might be found that would be useful to identify a UE. Alternatively, some new UE ID may be standardized and used for setting the time.

Another way to set the duration of the search time is by having a fixed duration provided by the network. For example, the network may pre-select a UE among a group of UEs performing D2D communication to be the default CH should network coverage be lost.

The network has the flexibility to set the timer to zero if it chooses to. Note that a fixed duration may be zero, corresponding to the UE becoming the CH immediately upon confirmation of the loss of network coverage. In a situation where the network can select one UE to immediately become CH when it goes out of range, for example, such as in a public safety case, the UE inside of a public safety vehicle or carried by a public safety worker would be pre-set to immediately become a CH once the UE leaves network coverage.

However, there could be a situation where there would be differentiation of UEs such that a UE in a vehicle might immediately become a CH once it leaves network coverage, while a handheld UE might not. In such a way, a hierarchy of UE durations could be established. For example, there could be a situation where the network can select one UE to immediately become CH when it goes out of range. In a public safety case, a UE inside the fire truck may immediately become a CH once the truck leaves network coverage. Other UEs like the handheld units will not become CH. Again, the network could have the flexibility to set the timer to zero if it chooses to for one device or device type and not another.

Differentiation for setting the duration for a search timer could be applicable to any of the other ways discussed herein for setting the search time duration, and pre-determining criteria may exist to set some timers to zero.

Another way to set the duration of the search time is by having a fixed duration negotiated with or provided by other UEs using non-LTE radio access technology. For example, UEs may have formed a cluster using WiFi or mesh network communications, and may wish to transition to LTE. In such a case, the selection of a CH could be pre-negotiated using non-LTE access.

Another way to set the duration of the search time is by UE class, capability, deployment or service type. For example, in a public safety scenario, UEs installed in vehicles may be preconfigured to act as a default CH should network coverage be lost. Alternately, UEs installed in vehicles may be configured with shorter duration than UEs in handsets. Similarly, high-power UEs may be configured with shorter duration than normal-power UEs.

Still another way to set the duration of the search time is by something as simple as by manual selection. For example, a public safety officer may manually configure the time of his/her UE based on his/her own judgment.

Any time duration can be set by the use of a timer where such timer is external or internal to the UE. Therefore, the duration of a timer could be set by some signal external to the UE being received by the UE. Such external timer could send a signal prior to the UE being out-of-coverage such that when the UE goes out-of-coverage, it would have its timing durations already determined. Timers could also be intrinsic to the UE and set in the factory, by use of a particular wireless carrier, by a particular network, or entered by a user.

Fixed time durations and settings may be made to be flexible, or vice versa, depending on various internal or external criteria or signaling.

Block 414 represents the UE conducting a cell or cluster search as a CH-candidate. Block 416 represents the result of that search determining whether the UE, as a CH candidate, has found another cell or cluster or found a suitable cell or cluster.

If within the search time duration or before expiration of the search timer a suitable cell or cluster is found, the UE will synchronize with the established cell or cluster using normal procedures represented by block 406.

If within the search time duration or before expiration of the search timer a suitable cell or cluster is not found, the UE will continue the search until the search duration time ends, or the search timer expires, represented by block 418. If the search duration time has not expired, the cell/cluster search of block 414 continues.

If no cluster or cell is found and the search time duration is reached, e.g. search timer expires, then the UE shall, as depicted in block 420, self-select as a CH. After that selection determination, block 422 shows how the UE will act as a CH for the active time duration. Acting as a CH entails the different functionalities as described earlier herein.

Some criteria to be used in determining the active time duration or an active timer may include service type (e.g. public safety, emergency transmission, machine type communication), power status (e.g. battery level), request from network, previous D2D communication, previous network communication, preconfigured by the network, or manual selection.

As a CH, the UE will be functioning in some capacity similar to that of a traditional base station as described earlier herein, such as the CH acting as scheduler so that the UEs within its cluster do not transmit at the same time and/or create interference with one another. In such a situation the CH acts like an eNB except that it would not receive any message or packet from the UE, but rather coordinating D2D communication.

Moreover, as CH the UE can send out a discovery signal thereby allowing other UEs to know of the existence of the cluster. If another UE would wish to join the cluster, then it could communicate with the CH. Block 424 represents whether the UE acting as CH connects with other UEs.

If the UE acting as CH does connect with another UE, it will continue to act as a CH until the active timer is reset or the active time duration expires.

There exist a wide variety of reasons for restarting the search time rather than letting the UE proceed as CH indefinitely. One such reason is the possibility that because of the mobility of the UE, the UE is once again in network coverage. Another reason might be that there could be another UE that, based on whatever criteria are being employed, would more appropriately be a CH. Moreover, acting as CH might drain power of the UE at a faster rate than is sustainable and so the UE may elect to not perform that function if a search can find another appropriate CH-candidate. Restarting the search time duration allows more advantageous configurations to arise under changing conditions.

Not shown in FIG. 4, but equally viable, is that at the end of the active time, the UE would return to another point earlier in the process. For example, the UE could return to the very beginning, block 402, doing a cell/cluster search for an initial time because after being a CH for a while, the UE may have lost the capacity to be a CH or presumed to have lost that capacity. Or other UEs might have entered the area that would be better suited as CH.

Also not shown in FIG. 4, but equally viable as an example, is that at the end of active time, the UE previously acting as CH could return to block 408 to make the determination again whether it can still function as a CH. For example, if the criteria to be a CH had included a certain power level, the UE may need to return to the determination of becoming a CH-candidate, block 408, in order to evaluate that power criteria or perhaps some other mutable criteria. Just as equally viable for example would be to return to block 12 setting the search timer.

Also not shown in FIG. 4 be equally viable would be if the active timer reset itself for a number of times, specified in some way, so that the active timer would function again for a number of iterations before being reset to another timer or the device is put to sleep for a sleep time duration.

Returning to block 424, if the UE acting as CH does not connect with another UE, then the process shall proceed to block 426 representing the UE going to sleep for a sleep time duration. In essence, the UE has tried to find a cluster but failed and became a CH for a while to see if anyone would join in. If there are no other UEs around capable of D2D communication and wishing to join it, the UE would go to sleep.

Once the CH goes to sleep, it goes to sleep for a sleep duration or for some time based on a sleep timer.

Some criteria to be used in determining the sleep time duration or sleep timer may be similar to that determining the active time duration or active timer such as include service type (e.g. public safety, emergency transmission, machine type communication), power status (e.g. battery level), request from network, previous D2D communication, previous network communication, preconfigured by the network, or manual selection.

As FIG. 4 shows, once awaking from the sleep timer or after the expiration of the sleep duration, the UE may return to acting as a CH for a period of time based on an active time duration or active timer. Not shown in FIG. 4, but equally viable, is that at the end of the sleep time, the UE would return to another point earlier in the process as described for after the resetting of the active timer above.

An exemplary embodiment of the invention consists of a method comprising determining a first user equipment to be a clusterhead candidate which can act as a clusterhead of a first cluster; searching by the first user equipment for a suitable cell or cluster to join; in response to finding the suitable cell or cluster to join, determining the first user equipment to be a normal user equipment and to synchronize with the suitable cell or cluster; and in response to not finding the suitable cell or a cluster to join, selecting the first user equipment to be a clusterhead which can act as a clusterhead of a first cluster.

In another exemplary embodiment of such a method, determining a first user equipment to be a clusterhead candidate comprises at least one of the following: service type; power status; request from network; previous D2D communication; UE class; UE capability; inter-RAT communication; preconfiguration by the network; manual selection; or criteria inherent in the first UE or external to the first UE.

In another exemplary embodiment of such a method, the searching is performed for a search timer duration.

In another exemplary embodiment of such a method, the search duration is determined by at least one of the following: a characteristic of the first UE, such as class, capability, deployment, service type or other distinguishing category; provided by the network; negotiated with or provided by other UEs using non-LTE radio access technology; manual selection; a signal external to the UE being received by the UE, or a fixed or variable duration criteria inherent in the first UE or external to the first UE.

In another exemplary embodiment of such a method, the search timer duration is determined by some useable form of ID associated with the first UE.

In another exemplary embodiment of such a method, prior to determining the first user equipment to be the clusterhead candidate, searching by the first UE for at least a cell or a cluster within an initial timer duration.

Another exemplary embodiment of the invention consists of a method comprising selecting a first user equipment to be a clusterhead; establishing a first cluster by the first user equipment; transmitting by the first user equipment a discovery signal which can alert other user equipment that the first user equipment is a clusterhead; in response to other user equipment responding to the discovery signal, allowing other user equipment to join the first cluster; and maintaining the first cluster.

In another exemplary embodiment of such a method, establishing a first cluster comprises the clusterhead scheduling transmissions by other user equipment which have joined the first cluster to at least not transmit at the same time, create interference with one another, or both.

In another exemplary embodiment of such a method, maintaining the first cluster and transmitting the discovery signal are performed for an active timer duration.

In another exemplary embodiment of such a method, the active timer duration is determined by at least one of the following: service type, power status, request from network, previous D2D communication, previous network communication, preconfigured by the network, manual selection, or criteria inherent in the first UE or external to the first UE.

In another exemplary embodiment of such a method, upon expiration of the active time duration, the first user equipment shall reset the active timer duration, go to sleep, or set another timer duration.

Although the descriptions above are primarily directed to current wireless standards, the techniques may be used for other wireless systems. For instance, the examples may be used for LTE systems. Transmission and reception herein may be performed through known techniques, such as those described by a number of 802.11 standards or LTE standards.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 3. A computer-readable medium may comprise a computer-readable storage medium (e.g., memory(ies) 314 or other device) that may be any media or means that can contain or store the instructions for use by or in connection with an instruction execution system, apparatus, or device, such as a computer. However, the computer-readable storage medium does not encompass propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

Furthermore, any of the methods described herein could be performed as the result of the use of a computer program. Such a computer program could be embodied on a computer program product. Moreover, an exemplary computer program product would include a non-transitory computer-readable storage medium bearing computer program code embodied therein for use with a computer. The computer program code includes instructions to control or carry out any of the methods described above. Also, a computer program code could comprise instructions to control or carry out determining a first user equipment to be a clusterhead candidate which can act as a clusterhead of a first cluster searching by the first user equipment for a suitable cell or cluster to join; in response to not finding the suitable cell or a cluster to join, selecting the first user equipment to be a clusterhead which can act as a clusterhead of a first cluster; establishing a first cluster by the first user equipment; transmitting by the first user equipment a discovery signal which can alert other user equipment that the first user equipment is a clusterhead; in response to other user equipment responding to the discovery signal, allowing other user equipment to join the first cluster; and maintaining the first cluster.

Moreover, any exemplary apparatus could perform its functions through the use of a computer code as described above or by using a computer code product as described above.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

μs microseconds
AP Access Point
BSS Basic Service Set
CDF Cumulate distribution function
CH Cluster head
CHR Cluster head reselection
CHS Cluster head selection
CSMA Carrier sense multiple access
CSMA-CA Carrier Sense Multiple Access-Collision Avoidance
CTS Clear to send
D2D Device-to-device
DARPA Defense Advanced Research Projects Agency
dB decibels
DCF Distributed Coordination Function
E-UTRAN Evolved UMTS terrestrial radio access network
eNB Evolved Node B
eNodeB E-UTRAN Node B, also known as Evolved Node B
ETSI European Telecommunications Standards Institute
FCC Federal Communications Commission
IFS Interframe Sensing
km kilometer
KW kilowatt
LAN Local Area Network
LTE Long Term Evolution
LTE-A LTE Advanced
MAC Medium Access Control
ms milliseconds
MTC Machine type communication
NAV Network Allocation Vector
NDP Null Data Packet
PCAST Presidential Council of Advisory for Science and Technology
RB Resource block
SINR Signal to Interference plus Noise Ratio
SSPARC Shared Spectrum Access of Radar Bands by Communications
STA Station, a wireless device
TDD Time Division Duplex
UE User equipment
UL uplink
UMTS Universal Mobile Telecommunication System
Wi-Fi Wireless Fidelity, a wireless local area network (and products) that are based on the Institute of Electrical and Electronics Engineers (IEEE) 802.11 standards WLAN Wireless Local Area Network

What is claimed is:

1. A method comprising:
   determining a first user equipment, of a wireless communications network, to be a clusterhead candidate without the need for a connection with the communications network and able to act as a clusterhead of a first cluster based at least on a pre-defined level of battery power, wherein the first user equipment has a high degree of mobility where topology of the network changes over time;
   searching by the first user equipment for a suitable cell or cluster to join;
   in response to not finding the suitable cell or a cluster to join, selecting the first user equipment to be a clusterhead which can act as a clusterhead of a first cluster.

2. The method of claim 1, wherein the determining a first user equipment to be a clusterhead candidate is additionally based on at least one of the following:
   service type;
   request from network;
   previous D2D communication;
   UE class;
   UE capability;
   inter-RAT communication;
   preconfiguration by the network;
   manual selection; or
   criteria inherent in the first UE or external to the first UE.

3. The method of claim 1, wherein the searching is performed for a search timer duration.

4. The method of claim 3, wherein the search timer duration is determined by at least one of the following:
   a characteristic of the first UE, such as class, capability, deployment, service type or other distinguishing category;
   provided by the network;
   negotiated with or provided by other UEs using non-LTE radio access technology;
   manual selection;
   a signal external to the UE being received by the UE, or
   a fixed or variable duration criteria inherent in the first UE or external to the first UE.

5. The method of claim 3, wherein the search timer duration is determined by some useable form of ID associated with the first UE.

6. The method of claim 1, wherein prior to determining the first user equipment to be the clusterhead candidate comprises:
   searching by the first UE for at least a cell or a cluster within an initial timer duration.

7. A method comprising:
   selecting a first user equipment, of a wireless communications network, to be a clusterhead without the need for a connection with the communications network based at least on a pre-defined level of battery power, wherein the first user equipment has a high degree of mobility where topology of the network changes over time;
   establishing a first cluster by the first user equipment;
   transmitting by the first user equipment a discovery signal which can alert other user equipment that the first user equipment is a clusterhead;
   in response to other user equipment responding to the discovery signal, allowing other user equipment to join the first cluster; and
   maintaining the first cluster.

8. The method of claim 7, wherein establishing a first cluster comprises the clusterhead scheduling transmissions by other user equipment which have joined the first cluster to at least
   not transmit at the same time,
   create interference with one another,
   or both.

9. The method of claim 7, wherein maintaining the first cluster and transmitting the discovery signal are performed for an active timer duration.

10. The method of claim 9, wherein the active timer duration is determined by at least one of the following:
    service type,
    power status,
    request from network,
    previous D2D communication,
    previous network communication,
    preconfigured by the network,
    manual selection, or
    criteria inherent in the first UE or external to the first UE.

11. The method of claim 9, wherein upon expiration of the active time duration, the first user equipment shall reset the active timer duration, go to sleep, or set another timer duration.

12. An apparatus comprising:
    at least one processor, and
    at least one memory including computer program code,
    wherein the at least one memory and the computer code are configured, with the at least one processor, to cause the apparatus to at least perform the following:
       determining a first user equipment, of a wireless communications network, to be a clusterhead candidate without the need for a connection with the communications network and able to act as a clusterhead of a first cluster based at least on a pre-defined level of battery power, wherein the first user equipment has a high degree of mobility where topology of the network changes over time;
       searching by the first user equipment for a suitable cell or cluster to join; and
       in response to not finding the suitable cell or a cluster to join, selecting the first user equipment to be a clusterhead which can act as a clusterhead of a first cluster.

13. The apparatus of claim 12, wherein the determining a first user equipment to be a clusterhead candidate is additionally base on at least one of the following:
    service type;
    request from network;
    previous D2D communication;
    UE class;
    UE capability;
    inter-RAT communication;
    preconfiguration by the network;
    manual selection; or
    criteria inherent in the first UE or external to the first UE.

14. The apparatus of claim 12, wherein the searching is performed for a search timer duration.

15. The apparatus of claim 14, wherein the search duration is determined by at least one of the following:
    a characteristic of the first UE, such as class, capability, deployment, service type or other distinguishing category;

provided by the network;
negotiated with or provided by other UEs using non-LTE radio access technology;
manual selection;
a signal external to the UE being received by the UE, or
a fixed or variable duration criteria inherent in the first UE or external to the first UE.

16. The apparatus of claim 14, wherein the search timer duration is determined by some useable form of ID associated with the first UE.

17. The apparatus of claim 12, wherein prior to determining the first user equipment to be the clusterhead candidate the at least one memory and the computer code are further configured, with the at least one processor, to cause the apparatus to at least perform the following:
searching by the first UE for at least a cell or a cluster within an initial timer duration.

18. An apparatus comprising:
at least one processor, and
at least one memory including computer program code, wherein the at least one memory and the computer code are configured, with the at least one processor, to cause the apparatus to at least perform the following:
selecting a first user equipment, of a wireless communications network, to be a clusterhead without the need for a connection with the communications network based at least on a pre-defined level of battery power, wherein the first user equipment has a high degree of mobility where topology of the network changes over time;
establishing a first cluster by the first user equipment;
transmitting by the first user equipment a discovery signal which can alert other user equipment that the first user equipment is a clusterhead;
in response to other user equipment responding to the discover signal, allowing other user equipment to join the first cluster; and
maintaining the first cluster.

19. The apparatus of claim 18, wherein establishing a first cluster comprises the clusterhead scheduling transmissions by other user equipment which have joined the first cluster to at least
not transmit at the same time,
create interference with one another,
or both.

20. The apparatus of claim 18, wherein maintaining the first cluster and transmitting the discovery signal are performed for an active timer duration.

21. The apparatus of claim 20, wherein the active timer duration is determined by at least one of the following:
service type,
power status,
request from network,
previous D2D communication,
previous network communication,
preconfigured by the network,
manual selection, or
criteria inherent in the first UE or external to the first UE.

22. The apparatus of claim 20, wherein upon expiration of the active time duration, the first user equipment shall reset the active timer duration, go to sleep, or set another timer duration.

23. A computer program product embodied on a non-transitory computer-readable medium, in which a computer program is stored which, when being executed by a computer, the computer program product is configured to provide instructions to control or carry out:
determining a first user equipment, of a wireless communications network, to be a clusterhead candidate without the need for a connection with the communications network which can act as a clusterhead of a first cluster based at least on a pre-defined level of battery power, wherein the first user equipment has a high degree of mobility where topology of the network changes over time;
searching by the first user equipment for a suitable cell or cluster to join;
in response to not finding the suitable cell or a cluster to join, selecting the first user equipment to be a clusterhead which can act as a clusterhead of a first cluster;
establishing a first cluster by the first user equipment;
transmitting by the first user equipment a discovery signal which can alert other user equipment that the first user equipment is a clusterhead;
in response to other user equipment responding to the discover signal, allowing other user equipment to join the first cluster; and
maintaining the first cluster.

* * * * *